Dec. 20, 1960     B. BARÉNYI ET AL     2,965,403
BUMPER CONSTRUCTION
Filed Oct. 21, 1954     2 Sheets-Sheet 1
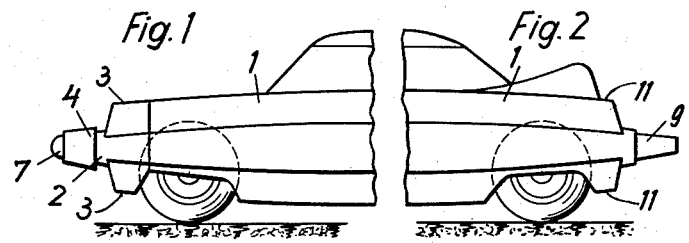
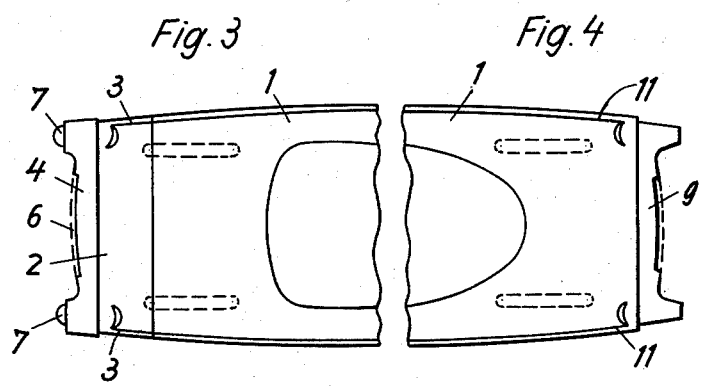
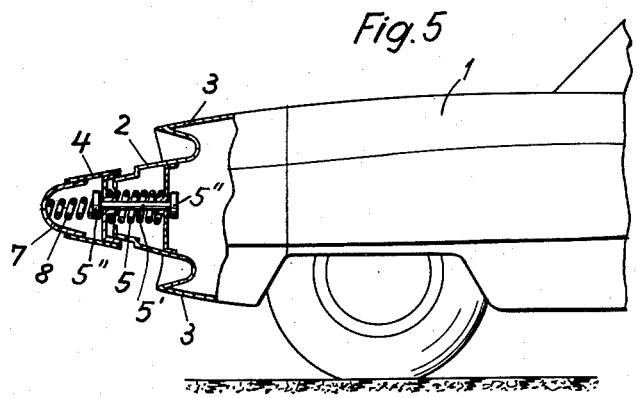
INVENTOR
BÉLA BARÉNYI AND
KARL WILFERT
BY Deeke and Craig
ATTORNEYS Dec. 20, 1960  B. BARÉNYI ET AL  2,965,403
BUMPER CONSTRUCTION
Filed Oct. 21, 1954  2 Sheets-Sheet 2
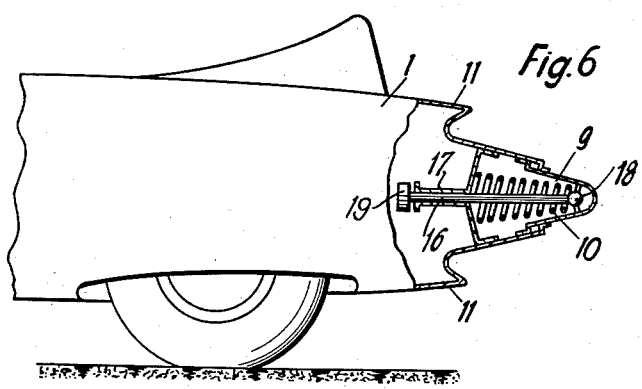
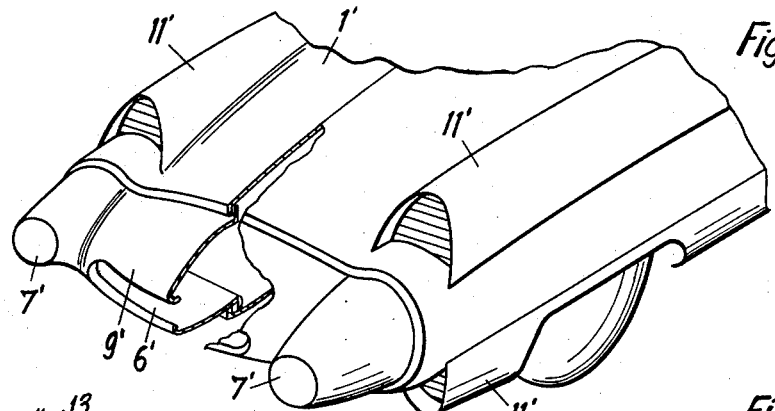
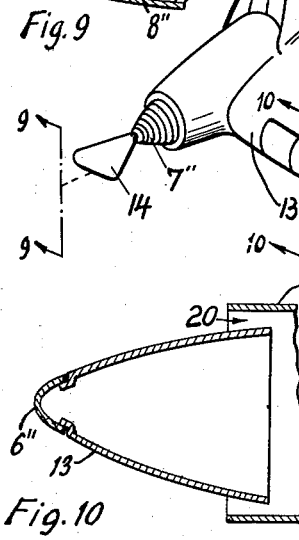
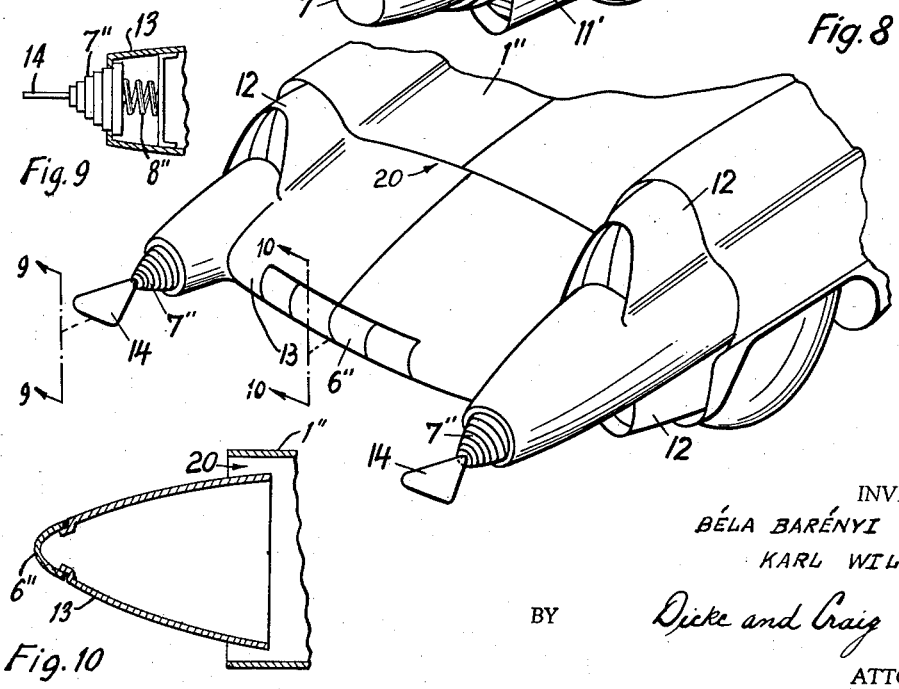
INVENTOR
BÉLA BARÉNYI AND
KARL WILFERT
BY Dicke and Craig
ATTORNEYS

United States Patent Office 2,965,403
Patented Dec. 20, 1960

2,965,403

BUMPER CONSTRUCTION

Béla Barényi, Stuttgart-Rohr, and Karl Wilfert, Stuttgart-Degerloch, Germany, assignors to Daimler-Benz Aktiengesellschaft, Stuttgart-Unterturkheim, Germany Filed Oct. 21, 1954, Ser. No. 463,740

14 Claims. (Cl. 293—63)

The present invention relates to motor vehicles, and more particularly to automobiles of streamlined shape in which an elongated main body portion terminates at least at one end in an opening which is closed by a caplike end piece or closure.

Prior to the invention, such end caps afforded very little, if any, protection for the car body since they were rigidly mounted thereon, with the result that even a minor collision of the car with some other object would easily and severely damage such end caps as well as the body of the car.

It is therefore one of the objects of the present invention to provide either the front or rear opening of a car body with a caplike closure which projects from the respective end of the car body, is shaped in accordance with the general design of the car body, and is mounted thereon so as to form an intermediate clearance or gap, and, further, to provide means for resiliently mounting such caplike closure either on the body or the frame of the car so that, if a pressure is exerted upon the caplike closure in the direction of the car body, the closure will resiliently telescope relative to the car body in the longitudinal direction of the latter. The opening at the front or rear of the car body which is closed by the cap-like structure extends generally transversely of the longitudinal direction of the car body and is defined by a portion of the vehicle body which is substantially closed upon itself in a plane transversely across the vehicle. The opening thus formed is exposed or faces in the longitudinal direction of the vehicle at the end thereof. Thus, in the event that the respective end of the car, that is, the projecting cap or any part thereof, should come into contact with some other object, neither the cap nor the respective end of the car body will be damaged, but the cap will act as a shock absorber or bumper, telescope inwardly toward the car body against the action of its springs, and thus substantially absorb the force directed either from the front or the rear upon the car body.

Another object of the invention is to combine the protective cap as above described with an air inlet or exhaust opening or grille either for the car engine or the ventilating system of the car.

Another object of the invention resides in providing the resilient cap structure and associated elements as a preassembled unit which may be built separately of the car body and be easily and quickly installed thereon.

A further object of the invention consists in combining the usual lighting fixtures of a car with the resilient cap structure so as to form an integral unit therewith.

Still other objects of the invention reside in the provision of resilient cushions or bumpers for protecting the caplike closure and, in turn, the body portion of the car, and in providing feeler elements on the most forwardly or rearwardly projecting portions of the car and in connecting such elements with suitable indicating means on the car for warning the driver that his car has touched some object which might damage it.

A feature of the invention for attaining the above mentioned objects consists in making the caplike end piece or closure of a shape substantially corresponding to that of the forward or rear end of the car body, and of a size either slightly smaller or larger than such ends so that the caplike end piece will be able to telescope resiliently either over or inwardly of the respective end of the car body in the longitudinal direction of the latter. The clearance or gap intermediate the caplike end piece and the respective end of the car body may then be made either of narrow width so as just to allow the two elements to telescope relative to each other without scraping, or so wide that it may form the main, or an auxiliary, air intake or exhaust opening or grille for the engine or the ventilating system of the car.

Another feature of the invention consists in molding the resilient caplike endpiece so as to form two outer forward or rearward projections which may, in turn, be provided with bumpers either of rubber or resiliently suppoted by springs mounted within the cap structure. Thus, such additional bumpers protect the caplike end piece as such and, in turn, cooperate with the springs supporting the cap to protect the respective open end of the car body. More specifically, these projections are preferably made of substantially conical or paraboloidal shape which is especially adapted to take up and uniformly transmit any forces which may be directed thereon in a collision. The feeler elements previously mentioned may, if desired, also be mounted on such projecting bumpers.

Still another feature of the invention consists in making the closure of the open ends of the car body of several interconnected elements by providing the caplike end piece with an adjoining connecting portion, of approximately annular cross-section defined by a connecting hollow body portion closed upon itself, i.e., the body forms a loop generally transversely of the longitudinal direction of the vehicle, which is secured to the end portion of the car body and facilitates the mounting of the entire cap structure thereon. These two end pieces, i.e. the caplike end piece and the approximately annular connecting portion, both preferably consist of a central part of a width several times as large as its height or thickness, and two lateral parts of a height or thickness larger than their width.

Further objects, features, and advantages of the present invention will be apparent from the following detailed description and the accompanying drawings of several embodiments of the invention, in which:

Fig. 1 shows a side view of the front part of an automobile;

Fig. 2 shows a side view of the rear part thereof;

Fig. 3 shows a top view of the part shown in Fig. 1;

Fig. 4 shows a top view of the part shown in Fig. 2;

Fig. 5 shows a side view similar to Fig. 1, but partly in section;

Fig. 6 shows a side view similar to Fig. 2, but partly in section;

Fig. 7 shows a perspective view of the front part of an automobile according to a modification of the invention with parts thereof broken away for the sake of clarity.

Fig. 8 shows a perspective view of another modification of the invention with parts thereof broken away for the sake of clarity;

Figure 9 is a cross-sectional view along line 9—9 of Figure 8 with some of the parts shown in full rather than in section for the sake of clarity; and Figure 10 is a partial cross-sectional view taken along line 10—10 of Figure 8.

Referring particularly to Figs. 1, 3, and 5 of the drawings, the streamlined elongated outer body 1 of an automobile has rigidly secured thereto, for example, at the front end thereof a connecting portion of approximately annular cross section, i.e., a connecting portion closed upon itself, i.e., the body forms a loop generally transversely of the longitudinal direction of the vehicle, of a shape fully in accordance with the design and shape of the body 1. The term "annular portion" will be used herein to describe the connecting portion designated by reference numeral 2 in Figures 1, 3 and 5 and to describe similar elements in other views. The design is preferably such that the body 1 has near its ends, both above and below as well as along each side, an arched portion which continues in the annular portion 2 so as to form arched end portions 3 therein. These arched portions 3 may terminate at the front end in lighting fixtures, such as head lights, fog lights, parking lights, blinkers, or the like. The open forward end of the attached annular portion 2 is covered by a cap 4 of trough-like shape which is slidable in the longitudinal direction of the vehicle relative to the annular portion 2 and resiliently mounted on the front end of the car by springs 5. The springs 5 urge the cap 4 away from the vehicle body to a limiting position determined by the rod 5' which has heads 5" at each end for limiting the expansion of the spring 5. The central part of the cap 4 may be provided with an air inlet 6 either for the engine or the ventilating system of the car, while the two lateral ends are of substantially conical shape, each serving as a housing or mounting of a bumper 7. These bumpers may either be made of a resilient material, such as rubber, or they may be resiliently mounted within the conical housings by springs 8 as in Figure 5. The springs 8 may be so located as not to interfere with the assembly or operation of the rod 5' and its associated spring 5.

In the embodiment of the invention as illustrated in Figs. 1, 3, and 5, the forwardly projecting annular portion 2 and the cap 4 together with its spring mounting constitute a single unit which may be assembled separately of the car body and then be secured to the front end thereof, preferably in a manner so as to be easily disconnected therefrom. Such design of the entire front end of the car as a separate unit facilitates the assembly of the car as well as repairs which might have to be made on the car body or on the front end thereof. Also, and especially if such unit includes the lighting fixtures, the entire unit may be very easily and quickly exchanged for a new unit if there should be any extensive damage therein caused by a collision.

In the embodiment of the invention as shown in Figs. 2, 4, and 6, the features substantially as described above are similarly applied to the rear end of a car. A trough-like cap 9 is mounted within a rear opening of the car body 1 and slideable therein against the action of springs 10. The movement of the cap 9 is guided in the longitudinal direction of the vehicle by means of rods 16 extending through the springs 10 longitudinally of the car body and each being connected at joint 18 to the cap at one end and slidably guided in a portion 17 of the car body adjacent its other end, the latter end having an enlarged end 19. The two lateral parts of the rear body also have arched portions 11 for housing the usual rear light fixtures, such as stop lights, parking lights, and the like.

Although in this embodiment of the invention the arched projecting portions 11 are shown as forming a part of the main body of the car, it is obvious that they may also be attached thereto and be built together with the trough-like cap 9 as a separate unit, similarly as shown in Figs. 1, 3, and 5.

The embodiment of the invention as shown in Fig. 7 illustrates a front end of a car designed similar to the rear end as shown in Figs. 2, 4, and 6, i.e., the cap 9' is mounted within the opening of the car body for telescoping sliding movement longitudinal of the vehicle within the front end thereof. The central part of cap 9' is again provided with an air inlet 6' and resiliently mounted within the front opening in the car body 1 so as to be slideable relative thereto, while the lateral parts of the car body have projecting portions 11' for housing the light fixtures. Similarly as in Figs. 1, 3, and 5, the lateral ends of the cap 9' also carry resilient bumpers 7'. As in the case of the bumper 7 of Figures 1, 3 and 5, the bumpers 7' may be made of a resilient material, such as rubber, secured in any suitable manner to the cap 9' instead of being mounted thereto by springs 8 in the manner illustrated in Figure 5.

The modification of the invention as shown in Fig. 8 differs from the embodiments previously described primarily by the hoods 12 of the light fixtures forming a part of the forward cap 13 which for this purpose is made of greater length. Thus, the light fixtures form an integral unit with the cap 13 and are resiliently mounted together with the cap 13 within the forward opening of the body 1". The bumpers 7" of the cap 13 may also be provided with feelers or contactors 14, as seen in Figures 8 and 9, for warning the driver when his car is touching some outer object. The bumpers 7" may be resiliently supported relative to the cap 13 by springs 8" in the manner illustrated in Figure 9 which is generally similar to the mounting of bumper 7 on the cap 4 of Figure 5.

For providing an air inlet opening, the central portion 13 may be provided with a grille or opening 6" at the forward end thereof. Either additionally or in place of such inlet 6", the central portion 13 may also be provided with one or more depressions at the point adjacent to the forward edge of the body 1" so that one or more inlet openings may thus be formed intermediate these two central portions, or, as indicated in Fig. 8 as well as in Figure 10, the upper wall of the entire central portion of the cap 13 or a relatively wide portion thereof may be less high from the ground than the adjacent central portion of the body 1 so that a wide air inlet channel 18 will thus be formed between the forward end of the body 1 and the cap 13.

If the rear end of the car be made similar to the front end, the projections 11' or 12, as shown in Figs. 7 or 8, respectively, may house the usual rear lights of a car, while the grille or opening 6' may be used either as an exhaust for the engine or as an air outlet for the interior ventilation of the car.

While the invention has been described in detail with respect to certain now preferred examples and embodiments of the invention, it will be understood by those skilled in the art that various changes and modifications may be made without departing from the spirit and scope of the invention as defined in the appended claims. Thus, for example, the slideable cap—either with or without the light fixtures—may be given any other shape or design than those shown to correspond with the design of the main body portion of the car, and the resilient mounting of such cap relative to the main body portion may be of any suitable construction. Also, such cap—either with or without the light fixtures—may be made of any suitable material, and it may be found desirable to mold the entire unit of a plastic composition.

Having thus described our invention, what we claim as new is:

1. In a streamlined automobile having an elongated main body portion having end portions extending generally transversely of the longitudinal direction of the vehicle and substantially the entire width of the vehicle with one opening at least at one end portion thereof, said opening extending generally transversely across the entire width of the vehicle and facing outwardly in the longitudinal direction of the vehicle, the improvement comprising one caplike closure for said opening extending substantially the width of the main body portion and projecting from and thereby effectively extending said main body portion and defining a body-protecting bumper structure, and means for resiliently mounting said closure on the main body portion so as to telescope in the longitudinal direction of the automobile relative to said end portion, said cap-like closure and the portion of said main body defining said opening overlapping in the longitudinal direction of the vehicle at the periphery of said opening.

2. In a streamlined automobile having an elongated main body portion having end portions extending generally transversely of the longitudinal direction of the vehicle and substantially the entire width of the vehicle with one opening at least at one end portion thereof, said opening extending generally transversely across the entire width of the vehicle and facing outwardly in the longitudinal direction of the vehicle, the improvement comprising one caplike closure for said opening extending substantially the width of the main body portion and projecting from and overlapping substantially all of said end portion and defining a body-protecting bumper structure, and means for resiliently mounting said closure on the main body portion so as to telescope in the longitudinal direction of the automobile relative to said end portion, said cap-like closure and the portion of said main body defining said opening overlapping in the longitudinal direction of the vehicle at the periphery of said opening.

3. In a streamlined automobile having an elongated main body portion having end portions extending generally transversely of the longitudinal direction of the vehicle and substantially the entire width of the vehicle with one opening at least at one end portion thereof, said opening extending generally transversely across the entire width of the vehicle and facing outwardly in the longitudinal direction of the vehicle, the improvement comprising one caplike closure for said opening extending substantially the width of the main body portion and projecting from said end portion to constitute a body-protecting bumper structure and extending into said opening therein, and means for resiliently mounting said closure on the main body portion so as to telescope in the longitudinal direction of the automobile relative to said end portion, said cap-like closure and the portion of said main body defining said opening overlapping in the longitudinal direction of the vehicle at the periphery of said opening.

4. In a streamlined automobile having an elongated main body portion having end portions extending generally transversely of the longitudinal direction of the vehicle and substantially the entire width of the vehicle with one opening at least at one end portion thereof, said opening extending generally transversely across the entire width of the vehicle and facing outwardly in the longitudinal direction of the vehicle, the improvement comprising one caplike closure for said opening extending substantially the width of the main body portion and projecting from said end portion to constitute a body-protecting bumper structure and forming a clearance intermediate said closure and the walls of said opening, said clearance being of varying width, and means for resiliently mounting said closure on the main body portion so as to telescope in the longitudinal direction of the automobile relative to said end portion, said cap-like closure and the portion of said main body defining said opening overlapping in the longitudinal direction of the vehicle at the periphery of said opening.

5. In a streamlined automobile having an elongated main body portion having end portions extending generally transversely of the longitudinal direction of the vehicle and substantially the entire width of the vehicle with one opening at least at one end portion thereof, said opening extending generally transversely across the entire width of the vehicle and facing outwardly in the longitudinal direction of the vehicle, the improvement comprising one caplike closure for said opening extending substantially the width of the main body portion and projecting from said end portion to constitute a body-protecting bumper structure and forming a clearance intermediate said closure and the walls of said opening, said clearance being of varying width, the wider portion of said clearance forming an air intake channel, and means for resiliently mounting said closure on the main body portion so as to telescope in the longitudinal direction of the automobile relative to said end portion, said cap-like closure and the portion of said main body defining said opening overlapping in the longitudinal direction of the vehicle at the periphery of said opening.

6. In a streamlined automobile having an elongated main body portion having end portions extending generally transversely of the longitudinal direction of the vehicle and substantially the entire width of the vehicle with one opening at least at one end portion thereof, said opening extending generally transversely across the entire width of the vehicle and facing outwardly in the longitudinal direction of the vehicle, the improvement comprising one caplike closure for said opening extending substantially the width of the main body portion and projecting from said end portion to constitute a body-protecting bumper structure and forming a clearance intermediate said closure and the walls of said opening, said clearance being of varying width, the wider portion of said clearance forming an exhaust channel, and means for resiliently mounting said closure on the main body portion so as to telescope in the longitudinal direction of the automobile relative to said end portion, said cap-like closure and the portion of said main body defining said opening overlapping in the longitudinal direction of the vehicle at the periphery of said opening.

7. In a streamlined automobile having an elongated main body portion having end portions extending generally transversely of the longitudinal direction of the vehicle and substantially the entire width of the vehicle with one opening at least at one end portion thereof, said opening extending generally transversely across the entire width of the vehicle and facing outwardly in the longitudinal direction of the vehicle, the improvement comprising one caplike closure for said opening projecting from and extending substantially across said main body portion and defining a body-protecting bumper structure, means for resiliently mounting said closure on the main body portion so as to telescope in the longitudinal direction of the automobile relative to said end portion, said cap-like closure and the portion of said main body defining said opening overlapping in the longitudinal direction of the vehicle at the periphery of said opening, and cushioning means projecting in the longitudinal direction of the automobile from said cap-like closure.

8. In a streamlined automobile having an elongated main body portion having end portions extending generally transversely of the longitudinal direction of the vehicle and substantially the entire width of the vehicle with one opening at least at one end portion thereof, said opening extending generally transversely across the entire width of the vehicle and facing outwardly in the longitudinal direction of the vehicle, the improvement comprising one caplike closure for said opening projecting from and extending entirely across said main body portion and defining a body-protecting bumper structure, means for resiliently mounting said closure on the main body portion so as to telescope in the longitudinal direction of the automobile relative to said end portion, said cap-like closure and the portion of said main body defining said opening overlapping in the longitudinal direction of the vehicle at the periphery of said opening, and cushioning means projecting in the longitudinal direction of the automobile from said cap-like closure and including spring means for resiliently mounting said cushioning means on said closure.

9. In a streamlined automobile having an elongated main body portion having end portions extending generally transversely of the longitudinal direction of the vehicle and substantially the entire width of the vehicle with an opening at least at one end portion thereof, said opening extending generally transversely across the entire width of the vehicle and facing outwardly in the longitudinal direction of the vehicle, the improvement comprising a caplike closure for said opening projecting from and extending said main body portion and defining a body-protecting bumper structure, said closure comprising a central portion and two lateral portions of substantially conical shape projecting from said central portion, means for resiliently mounting said closure on the main body portion so as to telescope in the longitudinal direction of the automobile relative to said end portion, said cap-like closure and the portion of said main body defining said opening overlapping in the longitudinal direction of the vehicle at the periphery of said opening, and cushioning means projecting from said conical portions.

10. In a streamlined automobile having an elongated main body portion having end portions extending generally transversely of the longitudinal direction of the vehicle and substantially the entire width of the vehicle with an opening at least at one end portion thereof, said opening extending generally transversely across the entire width of the vehicle and facing outwardly in the longitudinal direction of the vehicle, the improvement comprising a caplike closure for said opening projecting from and extending said main body portion and defining a body-protecting bumper structure, said closure comprising a central portion and two lateral portions of substantially conical shape projecting from said central portion, means for resiliently mounting said closure on the main body portion so as to telescope in the longitudinal direction of the automobile relative to said end portion, said cap-like closure and the portion of said main body defining said opening overlapping in the longitudinal direction of the vehicle at the periphery of said opening, and cushioning means projecting from said conical portions and including spring means within said conical portions for resiliently mounting said cushioning means on said closure.

11. In a streamlined automobile having an elongated main body portion having end portions extending generally transversely of the longitudinal direction of the vehicle and substantially the entire width of the vehicle with an opening at least at one end portion thereof, said opening extending generally transversely across the entire width of the vehicle and facing outwardly in the longitudinal direction of the vehicle, the improvement comprising a caplike closure for said opening projecting from and extending said main body portion and defining a body-protecting bumper structure, said closure comprising a central portion and two lateral portions of substantially conical shape projecting from said central portion, and spring means for resiliently mounting said closure on the main body portion so as to telescope in the longitudinal direction of the automobile relative to said end portion, said cap-like closure and the portion of said main body defining said opening overlapping in the longitudinal direction of the vehicle at the periphery of said opening, said spring means being mounted at least substantially within said conical portions.

12. In a streamlined automobile having an elongated main body portion having end portions extending generally transversely of the longitudinal direction of the vehicle and substantially the entire width of the vehicle with an opening at least at one end portion thereof, said opening extending generally transversely across the entire width of the vehicle and facing outwardly in the longitudinal direction of the vehicle, the improvement comprising a caplike closure for said opening projecting from and extending said main body portion and defining a body-protecting bumper structure, said closure comprising a central portion and two lateral portions of substantially conical shape projecting from said central portion, spring means for resiliently mounting said closure on the main body portion so as to telescope in the longitudinal direction of the automobile relative to said end portion, said cap-like closure and the portion of said main body defining said opening overlapping in the longitudinal direction of the vehicle at the periphery of said opening, and cushioning means projecting from said conical portions and including spring means for resiliently mouting said cushioing means on said closure, both of said spring means being mounted at least substantially within said lateral portions.

13. In a streamlined automobile having an elongated main body portion having end portions extending generally transversely of the longitudinal direction of the vehicle and substantially the entire width of the vehicle with one opening at least at one end portion thereof, said opening extending generally transversely across the entire width of the vehicle and facing outwardly in the longitudinal direction of the vehicle, the improvement comprising a connecting portion of approximately annular cross-section adapted to be secured to said end portion and to extend across substantially the entire width of the main body portion, one cap-like portion for closing the opening of said annular connecting portion and defining a body protecting bumper structure extending outwardly in the longitudinal direction of the vehicle from said connecting portion, means for resiliently mounting said caplike portion on said connecting portion so as to telescope in the longitudinal direction of the automobile relative to said annular connecting portion, said cap-like closure and the portion of said main body defining said opening overlapping in the longitudinal direction of the vehicle at the periphery of said opening, said annular connecting and caplike portions and said resilient means forming a self-contained unit, and means for securing said unit to said end portion.

14. In a streamlined automobile having an enlongated main body portion having end portions extending generally transversely of the longitudinal direction of the vehicle and substantially the entire width of the vehicle with an opening at least at one end portion thereof, said opening extending generally transversely across the entire width of the vehicle and facing outwardly in the longitudinal direction of the vehicle, the improvement comprising a connecting portion of approximately annular cross section adapted to be secured to said end portion to extend the same, a caplike portion for closing the opening of said annular connecting portion and defining a body protecting bumper structure extending outwardly in the longitudinal direction of the vehicle from said connecting portion, means for resiliently mounting said caplike portion on said connecting portion so as to telescope in the longitudinal direction of the automobile relative to said annular connecting portion, said cap-like closure and the portion of said main body defining said opening overlapping in the longitudinal direction of the vehicle at the periphery of said opening, said annular connecting and caplike portions and said resilient means forming a self-contained unit, said annular connecting and caplike portions each comprising a central part and two lateral parts, said central part having a width several times larger than its height, said lateral parts having a height larger than their width, and means for securing said unit to said end portion.

References Cited in the file of this patent

UNITED STATES PATENTS

D. 170,171    Stevens  --------------- Aug. 11, 1953

(Other references on following page)

UNITED STATES PATENTS

| | | |
|---|---|---|
| D. 178,542 | Scott | Aug. 14, 1956 |
| 524,217 | Richards | Aug. 7, 1894 |
| 1,503,049 | Jezek | July 29, 1924 |
| 1,545,486 | Cotton | July 14, 1925 |
| 1,727,070 | Kruckenberg et al. | Sept. 3, 1929 |
| 1,773,928 | Ambush | Aug. 26, 1930 |
| 2,074,469 | Haynes | Mar. 23, 1937 |
| 2,104,182 | Best | Jan. 4, 1938 |

FOREIGN PATENTS

| | | |
|---|---|---|
| 766,248 | France | June 25, 1934 |
| 1,107,813 | France | Aug. 10, 1955 |
| 302,163 | Italy | Oct. 20, 1932 |

OTHER REFERENCES

Cars, November 1953 issue, page 18 (published by Fawcett Publications, Inc., Greenwich, Connecticut).